United States Patent
Fukasawa

(10) Patent No.: US 7,167,275 B2
(45) Date of Patent: Jan. 23, 2007

(54) IMAGE PROCESSING APPARATUS, IMAGE PROCESSING METHOD, PROGRAM, AND RECORDING MEDIUM

(75) Inventor: Kenji Fukasawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 180 days.

(21) Appl. No.: 09/971,061

(22) Filed: Oct. 5, 2001

(65) Prior Publication Data

US 2002/0060799 A1  May 23, 2002

(30) Foreign Application Priority Data

| Oct. 6, 2000 | (JP) | ............................ 2000-308067 |
| Feb. 9, 2001 | (JP) | ............................ 2001-033336 |
| Sep. 14, 2001 | (JP) | ............................ 2001-279213 |

(51) Int. Cl.
*H04N 1/60* (2006.01)

(52) U.S. Cl. ...................... 358/1.9; 358/518; 358/523; 345/600; 345/601

(58) Field of Classification Search ................ 358/1.9, 358/518–523; 382/167; 345/600, 601, 604
See application file for complete search history.

(56) References Cited

U.S. PATENT DOCUMENTS

| 5,734,745 | A |   | 3/1998 | Ohneda ...................... 382/167 |
| 5,933,253 | A | * | 8/1999 | Ito et al. ..................... 358/518 |
| 6,414,690 | B1 | * | 7/2002 | Balasubramanian et al. ..... 382/167 |
| 6,573,889 | B1 | * | 6/2003 | Georgiev .................... 345/419 |
| 6,882,445 | B1 | * | 4/2005 | Takahashi et al. ........... 358/1.9 |

FOREIGN PATENT DOCUMENTS

| EP | 0 488 656 A |   | 6/1992 |
| JP | 04-196678 |   | 11/1990 |
| JP | 05-205039 |   | 1/1992 |
| JP | 06-225132 |   | 8/1994 |
| JP | 09-009082 |   | 6/1995 |
| JP | 07095427 A |   | 7/1995 |
| JP | 09-200560 |   | 1/1996 |
| JP | 08-032827 |   | 2/1996 |
| JP | 09-224162 |   | 2/1996 |
| JP | 08-214175 |   | 8/1996 |
| JP | 08214175 A | * | 8/1996 |
| JP | 09009082 A | * | 1/1997 |
| JP | 09 009082 A |   | 5/1997 |

(Continued)

*Primary Examiner*—Scott A. Rogers
(74) *Attorney, Agent, or Firm*—Lowe Hauptman & Berner, LLP

(57) ABSTRACT

To provide a method for generating color-correction lookup table for better using a color reproduction area of an output system, an image processing apparatus, an image processing method, and a recording medium.

An image processing apparatus uses a color-correction lookup table to apply a desired color correction to an input image signal. The image processing apparatus is provided with a color-correction lookup table for chroma enhancement, which applies chroma-enhancement processing to a desired color point in the input image signal in an area where an output system gamut is wider than an input system gamut, and uses the color-correction lookup table for chroma enhancement according to the input image signal for performing the desired color correction. The color-correction lookup table for chroma enhancement does not perform the chroma-enhancement processing when the desired color point is close to achromatic color.

12 Claims, 15 Drawing Sheets

FOREIGN PATENT DOCUMENTS

| | | | |
|---|---|---|---|
| JP | 09-135360 | | 5/1997 |
| JP | 09200560 A | * | 7/1997 |
| JP | 09 200560A A | | 11/1997 |
| JP | 2001036757 A | * | 2/2001 |
| JP | 2001-203906 | | 7/2001 |
| JP | 2001-313839 | | 9/2001 |
| JP | 2002-152540 | | 5/2002 |

* cited by examiner

IMAGE PROCESSING APPARATUS, IMAGE PROCESSING METHOD, PROGRAM, AND RECORDING MEDIUM

BACKGROUND OF INVENTION

1. Field of Invention

The present invention relates to a color-correction lookup table-generating method, an image processing apparatus, an image processing method, a program, and a recording medium when a color reproduction area of an input system is different from a color reproduction area of an output system.

2. Description of the Related Art

When printing process is performed based on monitor image signals by using a printer or the like, since they have different color representing systems, color conversion is necessary. Usually, color reproduction process by a printer is performed by color matching where a target of input image data in RGB is assumed as a color reproduction area of a monitor.

However, a range in the color reproduction area of a monitor where RGB data are specified does not cover an entire color reproduction area of a printer. For example, there is an area where color reproduction by a printer is possible and color reproduction by a monitor is not possible in a color reproduction area from green to blue.

SUMMARY OF INVENTION

As long as the color matching is performed with the color reproduction area of a monitor as a target, a color which is reproduced by a printer and is not reproduced by a monitor is not provided from a printer. When a capability of a printer main unit can reproduce colors of an original image, since the monitor matching is performed, the capability of printer is not fully exhibited, and print is performed with a color with low chroma.

The present invention is for solving the problem described above, and has a purpose for providing a method for generating color-correction lookup table for efficiently using a color reproduction area of an output system such as a printer, an image processing apparatus, an image processing method, a program, and a recording medium.

The present invention as described in claim 1, is an image processing apparatus wherein a degree of chroma-enhancement processing is changed according to magnitude of an input system gamut, and a desired color correction is applied by using a color-correction lookup table for enhancing chroma, which applies a desired chroma-enhancement processing to a desired color point in an input image signal, in an area where an output system gamut is wider than the input system gamut.

The present invention as described in claim 2, is an image processing apparatus wherein a desired color correction is applied by using a color-correction lookup table for enhancing chroma, which applies a chroma-enhancement processing in a direction approximately perpendicular to an input system gamut surface to a desired color point in an input image signal, in an area where an output system gamut is wider than the input system gamut.

The present invention as described in claim 3, is the image processing apparatus as claimed in Claim 1 wherein the degree of chroma-enhancement processing with said color-correction lookup table for enhancing chroma is changed according to the type of input system gamut.

The present invention as described in claim 4, is the image processing apparatus as claimed in Claim 1 wherein the degree of chroma-enhancement processing with said color-correction lookup table for enhancing chroma increases as the magnitude of input system gamut decreases.

The present invention as described in claim 5, is the image processing apparatus as claimed in Claim 1 wherein a desired color correction is applied by using a color-correction lookup table for compression process, which applies a compression process to a desired color point in the input image signal, in an area where the output system gamut is narrower than the input system gamut.

The present invention as described in claim 6, is the image processing apparatus as claimed in Claim 1 wherein said color-correction lookup table for enhancing chroma does not apply the chroma-enhancement processing when said desired color point is close to achromatic.

The present invention as described in claim 7, is the image processing apparatus as claimed in Claim 1 wherein said chroma-enhancement processing is performed so as to retain hue.

The present invention as described in claim 8, is the image processing apparatus as claimed in any one of Claims 5–7 wherein said compression processing is performed so as to retain hue.

The present invention as described in claim 9, is the image processing apparatus as claimed in Claim 1 wherein said color-correction lookup table for enhancing chroma adjusts degree of the chroma enhancement.

The present invention as described in claim 10, is the image processing apparatus as claimed in Claim 1 wherein said color-correction lookup table for enhancing chroma has a limiting value for the chroma enhancement.

The present invention as described in claim 11, is the image processing apparatus as claimed in Claim 1 wherein a desired color correction is applied by using the color-correction lookup table for enhancing chroma when the input image signal includes large green component and blue component.

The present invention as described in claim 12, is the image processing apparatus as claimed in Claim 1 wherein a desired color correction is applied by using the color-correction lookup table for enhancing chroma according to the type of input image signal.

The present invention as described in claim 11, is the image processing apparatus as claimed in Claim 1 wherein a desired color correction is applied by using the color-correction lookup table for enhancing chroma when the input image signal represents a bit image.

The present invention as described in claim 14, is an image processing method wherein a degree of chroma-enhancement processing is changed according to magnitude of an input system gamut, and a desired color correction is applied by using a color-correction lookup table for enhancing chroma, which applies a desired chroma-enhancement processing to a desired color point in an input image signal, in an area where an output system gamut is wider than the input system gamut.

The present invention as described in claim 15, is an image processing method wherein a desired color correction is applied by using a color-correction lookup table for enhancing chroma, which applies a chroma-enhancement processing in a direction approximately perpendicular to an input system gamut surface to a desired color point in an input image signal, in an area where an output system gamut is wider than the input system gamut.

The present invention as described in claim 16, is a program of instructions for execution by a computer to perform an image processing, wherein a degree of chroma-enhancement processing is changed according to magnitude of an input system gamut, and a desired color correction is applied by using a color-correction lookup table for enhancing chroma, which applies a desired chroma-enhancement processing to a desired color point in an input image signal, in an area where an output system gamut is wider than the input system gamut.

The present invention as described in claim 17, is a program of instructions for execution by a computer to perform an image processing, wherein a desired color correction is applied by using a color-correction lookup table for enhancing chroma, which applies a chroma-enhancement processing in a direction approximately perpendicular to an input system gamut surface to a desired color point in an input image signal, in an area where an output system gamut is wider than the input system gamut.

The present invention as described in claim 18, is a computer-readable medium storing the program as described in claim 16 or 17.

The present invention as described in claim 19, is a computer-readable medium storing a color-correction lookup table to perform a chroma-enhancement processing, wherein a degree of chroma-enhancement processing is changed according to magnitude of an input system gamut, and a desired color correction is applied by using the color-correction lookup table for enhancing chroma, which applies a desired chroma-enhancement processing to a desired color point in an input image signal, in an area where an output system gamut is wider than the input system gamut.

The present invention as described in claim 20, is a computer-readable medium storing a color-correction lookup table to perform a chroma-enhancement processing, wherein a desired color correction is applied by using the color-correction lookup table for enhancing chroma, which applies a chroma-enhancement processing in a direction approximately perpendicular to an input system gamut surface to a desired color point in an input image signal, in an area where an output system gamut is wider than the input system gamut.

The present invention as described in claim 21, is the image processing apparatus as claimed in Claim 2 wherein the degree of chroma-enhancement processing with said color-correction lookup table for enhancing chroma is changed according to the type of input system gamut.

The present invention as described in claim 22, is the image processing apparatus as claimed in Claim 2 wherein the degree of chroma-enhancement processing with said color-correction lookup table for enhancing chroma increases as the magnitude of input system gamut decreases.

The present invention as described in claim 23, is the image processing apparatus as claimed in Claim 2 wherein a desired color correction is applied by using a color-correction lookup table for compression process, which applies a compression process to a desired color point in the input image signal, in an area where the output system gamut is narrower than the input system gamut.

The present invention as described in claim 24, is the image processing apparatus as claimed in Claim 2 wherein said color-correction lookup table for enhancing chroma does not apply the chroma-enhancement processing when said desired color point is close to achromatic.

The present invention as described in claim 25, is the image processing apparatus as claimed in Claim 23 or 24 wherein said compression processing is performed so as to retain hue.

The present invention as described in claim 26, is the image processing apparatus as claimed in Claim 2 wherein said color-correction lookup table for enhancing chroma adjusts degree of the chroma enhancement.

The present invention as described in claim 27, is the image processing apparatus as claimed in Claim 2 wherein said color-correction lookup table for enhancing chroma has a limiting value for the chroma enhancement.

The present invention as described in claim 28, is the image processing apparatus as claimed in Claim 2 wherein a desired color correction is applied by using the color-correction lookup table for enhancing chroma when the input image signal includes large green component and blue component.

The present invention as described in claim 29, is the image processing apparatus as claimed in Claim 2 wherein a desired color correction is applied by using the color-correction lookup table for enhancing chroma according to the type of input image signal.

The present invention as described in claim 30, is the image processing apparatus as claimed in Claim 2 wherein a desired color correction is applied by using the color-correction lookup table for enhancing chroma when the input image signal represents a bit image.

DESCRIPTION OF THE PREFERRED EMBODIMENTS

The following section describes preferred embodiments of the present invention while referring to Figures.

Figure 1:
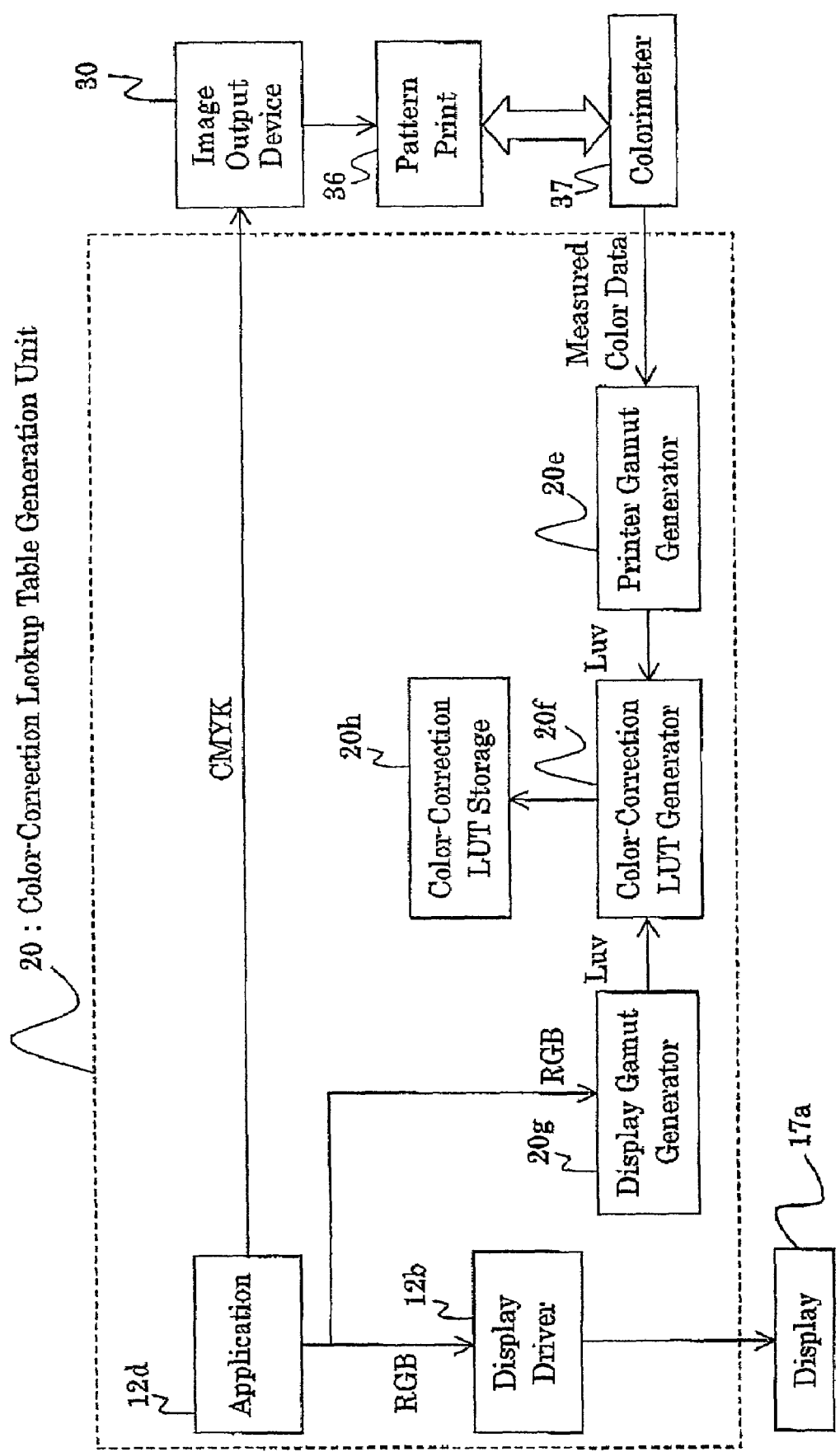
FIG. 1 is a function block diagram of an image processing apparatus relating to an embodiment of the present invention.
Figure 2:
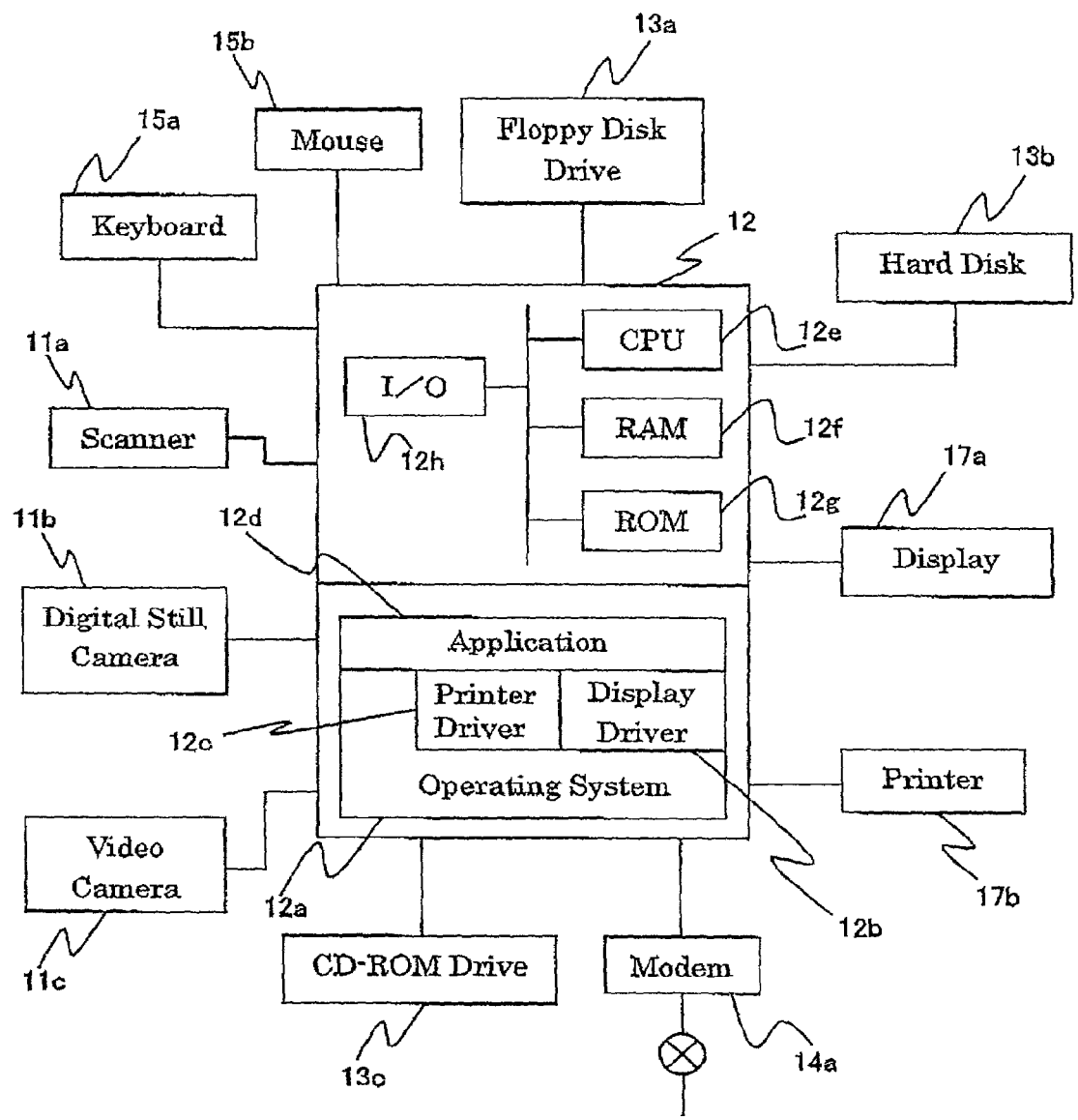
FIG. 2 is a schematic block diagram for showing an example of a specific hardware constitution for the image processing apparatus relating to the embodiment of present invention.
Figure 11:
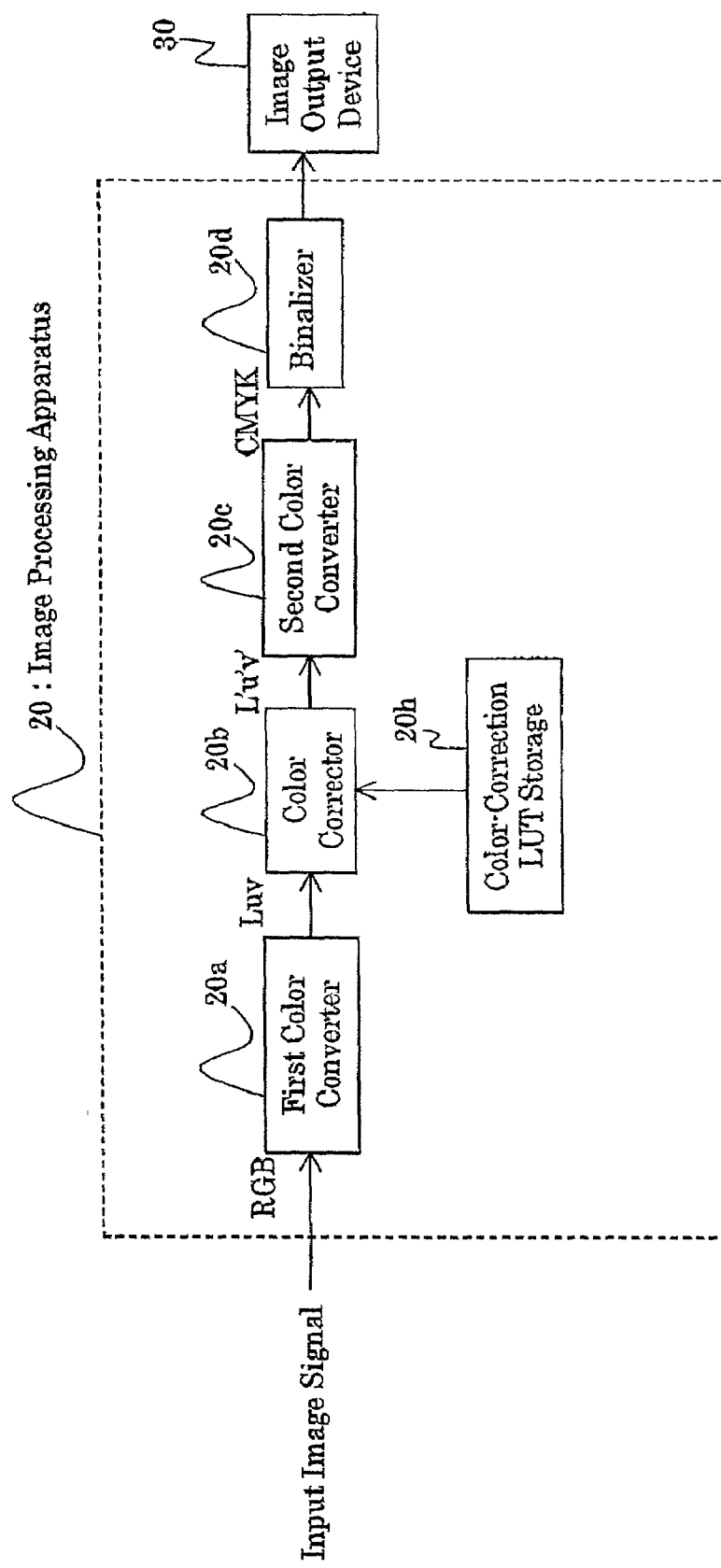
FIG. 11 is a function block diagram for color-correction lookup table generator relating to the embodiment of present invention.

FIG. 1 is a function block diagram for an apparatus for generating a color-correction lookup table relating to an embodiment of the present invention, FIG. 11 is a function block diagram for an image processing apparatus relating to an embodiment of the present invention, and FIG. 2 represents an example of a specific hardware constitution for the apparatus for generating a color-correction lookup table and the image processing apparatus as a schematic block diagram.

In FIG. 1, an apparatus for generating color-correction lookup table generator 20 is provided with a display gamut generator 20g for generating a display gamut based on RGB data generated by an application 12d, a printer gamut generator 20e for generating a printer gamut based on a measured result of a colorimeter 37, a color-correction LUT generator 20f for generating a color-correction lookup table (LUT) based on the generated printer gamut and the display gamut, and a color-correction LUT storage 20h for storing the generated color-correction LUT. Processes of these individual constituting parts are described in detail later. For the display image data generated by the application 12d, a video driver 12b writes it into a predetermined image memory, and displays it on a display 17a through a hardware circuit.

In FIG. 11, an image processing apparatus 20A applies a predetermined image processing to an input color image signal (data), and provides an image output device 30 with the color image data applied with the image processing. The color image data here is produced by decomposing a color image into predetermined element colors, and represents intensities of these individual element colors, and presents chromatic colors, which comprises achromatic colors represented by gray and black when they are mixed at a predetermined ratio. The present embodiment describes a printing process of an image output device 30 such as a printer based on CMYK data.

Though, on the display 17a, a color image is represented as a gradation display with three primary colors comprising red, green and blue (R, G, B) at individual pixels arranged horizontally and vertically, the color image is printed in four colors (C, M, Y, K) comprising cyan, magenta, yellow, and black without gradation display in the present embodiment. Thus, a color conversion from the three-primary-color (R, G, B) display in red, green and blue to four-color (C, M, Y, K) display in cyan, magenta, yellow and black and a gradation conversion from the gradation display to the non-gradation display are required for color printing.

The image processing apparatus 20A comprises a first color converter 20a for converting the RGB image data to image data in Luv coordinate system, a color corrector 20b for reading a selected color-correction lookup table from the color-correction LUT storage 20h, and converting the Luv coordinate system image data for display to Luv coordinate system image data for a printer while referring to the read color-correction LUT, a second color converter 20c for converting the Luv coordinate system image data into CMYK (cyan, magenta, yellow, black) data, and a binarizer 20d for converting the CMYK data into binary data.

The present embodiment employs a computer system as an example of hardware for realizing the color-correction look-p table generator 20 and the image processing apparatus 20A. FIG. 2 shows the computer system as a block diagram. The computer system is provided with a scanner 11a, a digital still camera 11b, and a video camera 11c as image input devices, and they are connected with a computer main unit 12. The individual input devices generate an image data where an image is represented by pixels arranged as dot matrix, and provide the computer main unit 12 with the image data, where the image data represents about 16,7 million colors by 256-gradation display in three primary colors comprising R, G, and B.

A floppy disk drive 13a, a hard disk drive 13b, and a CD-ROM drive 13c are connected with the computer main unit 12 as external auxiliary storage apparatuses, the hard disk 13b stores base programs relating to the system, and necessary programs are read from a floppy disk and a CD-ROM as required. A modem 14a is connected for connecting the computer main unit 12 with an external network or the like as a communication device, and software and data are downloaded for introduction by connecting to the external network through a public communication line. In this example, though the modem 14a is used for the external access through the telephone line, a constitution for access to a network through a LAN adaptor is also possible. In addition, a keyboard 15a and a mouse 15b are connected for operating the computer main unit 12.

The computer main unit 12 is provided with a display 17a and a color printer 17b as image output devices. The display 17a is provides with a display area comprising 800 pixels in the horizontal direction and 600 pixels in the vertical direction, and 16,7 million colors are displayed on the individual pixels. This resolution is an example, and the resolution may be changed to 640×480 or 1024×768 as needed.

The color printer 17b is an ink jet printer, and prints an image on a print sheet as a medium with color ink of four colors comprising C, M, Y, and K. As image resolution, high density print such as 360×360 dpi or 720×720 dpi is available, and as gradation representation, two-gradation representation by selecting whether attaching the color ink or not is available. A predetermined program is running on the computer main unit 12 to obtain an image through the image input devices, and to display or to provide on the image output device. An operating system (OS) 12a operates as a base programs, and a display driver (DSP DRV) 12b and a printer driver (PRT DRV) 12c are integrated into the operating system 12a. The divers 12b and 12c depend on the models of display 17a and the color printer 17b, and are added to or changed in the operating system 12a according to the models. It is also possible to realize a feature in addition to a standard processing depending on the models. In other words, different additional processes are realized in a permissible range while a common processing system is maintained on a standard system as the operating system 12a.

As a prerequisite for running the program, the computer main unit 12 is provided with a CPU 12e, a RAM 12f, a ROM 12g, an I/O 12h and the like, and the CPU 12e executes the base program written in the ROM 12g gas needed while using the RAM 12f as a temporary work area or specified memory area, or a program area, and controls the external apparatuses connected through the I/O 12h and internal apparatuses.

The application 12d is executed on the operating system 12a, which serves as the base program. Contents of the processing in application 12d vary, and include monitoring the operation of keyboard 15a and the mouse 15b as operating devices, properly controlling the different external apparatuses, executing corresponding calculation and the like when they are operated, and displaying or providing a processed result on the display 17a or the color printer 17b.

The computer system obtains image data through the scanner 11a as an image input device, performs a predetermined image processing with the application 12d, and show the processed result as output on the display 17a or the color printer 17b, which serve as image output devices.

The display driver 12b and the printer driver 12c are stored on the hard disk 13b, are read into the computer main unit 12 on startup, and operate. They are stored on a medium such as a CD-ROM or a floppy disk when they are introduced. Thus, these media constitute media for storing the image processing program. The image processing program itself is included in the scope of present invention. In the present invention, though the image processing apparatus is realized as a computer system, the computer system is not necessarily required, and a system that applies the process required in the present invention to similar image data is possible. A system where an image processing system for performing the image processing of present invention is integrated in a digital still camera, and image data after the image processing are used for printing through a color printer is possible. For a color printer, which obtains image data and prints without a computer system, it is possible to constitute such that the image processing of present invention is automatically applied on image data obtained through a scanner, a digital still camera, modem or the like and printing is processed.

The present invention is naturally applicable to different apparatuses for handling image data such as a color facsimile apparatus or a color copy apparatus as well.

The following section describes processing program for generating and storing a color-correction lookup table, which is executed by the color-correction lookup table generator 20 shown in FIG. 1 while referring to FIG. 3 to FIG. 6.

Figure 3:
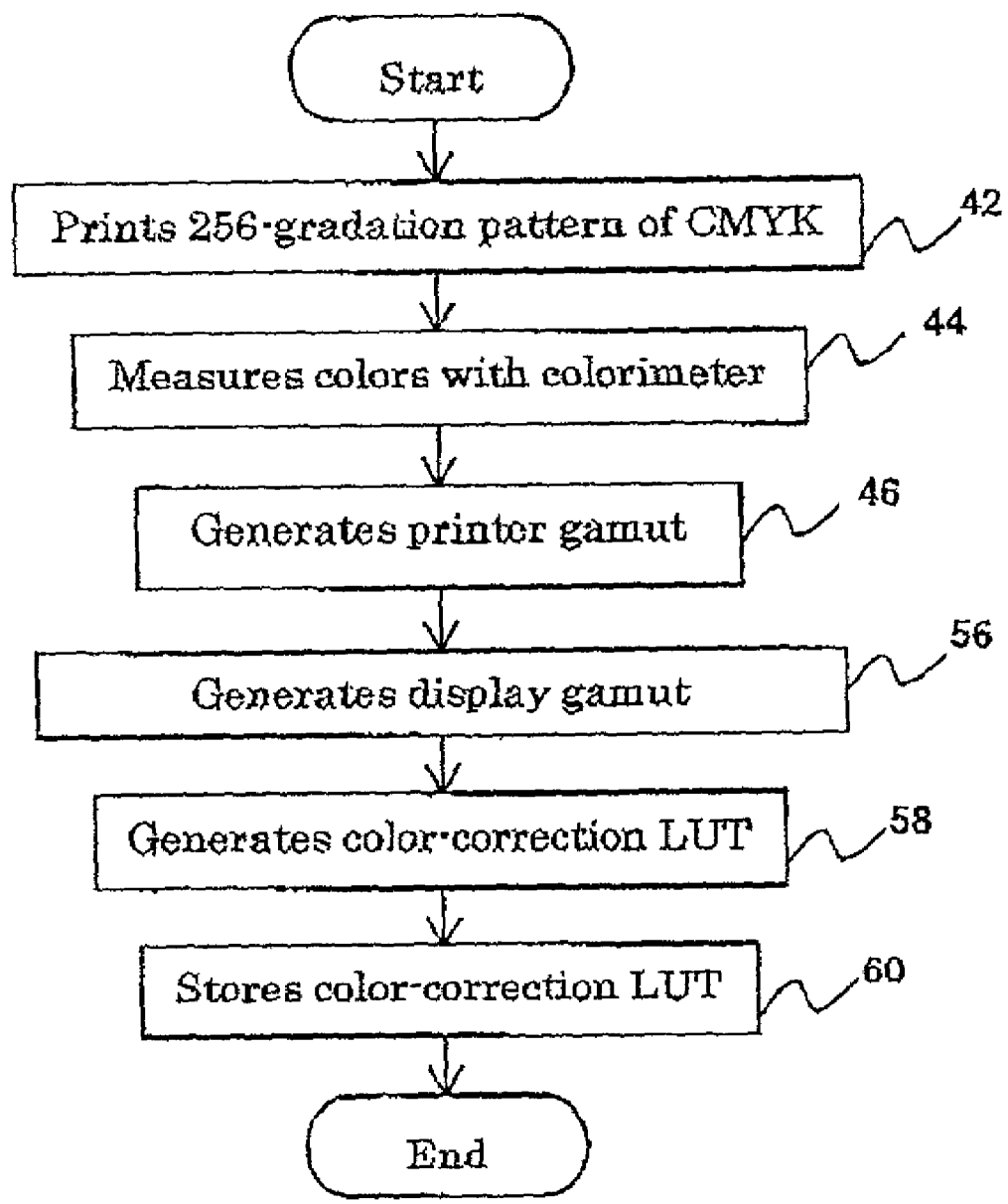
FIG. 3 is a flowchart for describing processing for generating and storing color-correction lookup table by the image processing apparatus 20 of present invention.

The FIG. 3 is a flowchart for describing the processing program for generating and storing a color-correction lookup table, which is executed by the color-correction lookup table generator 20 of present embodiment.

As described in FIG. 3, first, 256-gradation pattern of the CMYK ink 36 is printed (Step 42). The colorimeter 37 measures colors of the printed pattern, and color measurement data measured for individual patterns are provided for the printer gamut generator 20e (Step 44). The printer gamut generator 20e generates a printer gamut (output system gamut) in L*a*b* space based on the color measurement data (Step 46), and provides the color-correction LUT generator 20f with it.

The display gamut generator 20g generates a display gamut (input system gamut) in L*a*b* space based on the RGB data generated by the application 12d (Step 56), and provides the color-correction LUT generator 20f with it.

The color-correction LUT generator 20f generates the color-correction lookup table with a method for generating a color-correction lookup table described later while referring to FIG. 4 to FIG. 6 (Step 58). The color-correction LUT generated by the color-correction LUT generator 20f is stored in the color-correction LUT storage 20h (Step 60).

Figure 4:
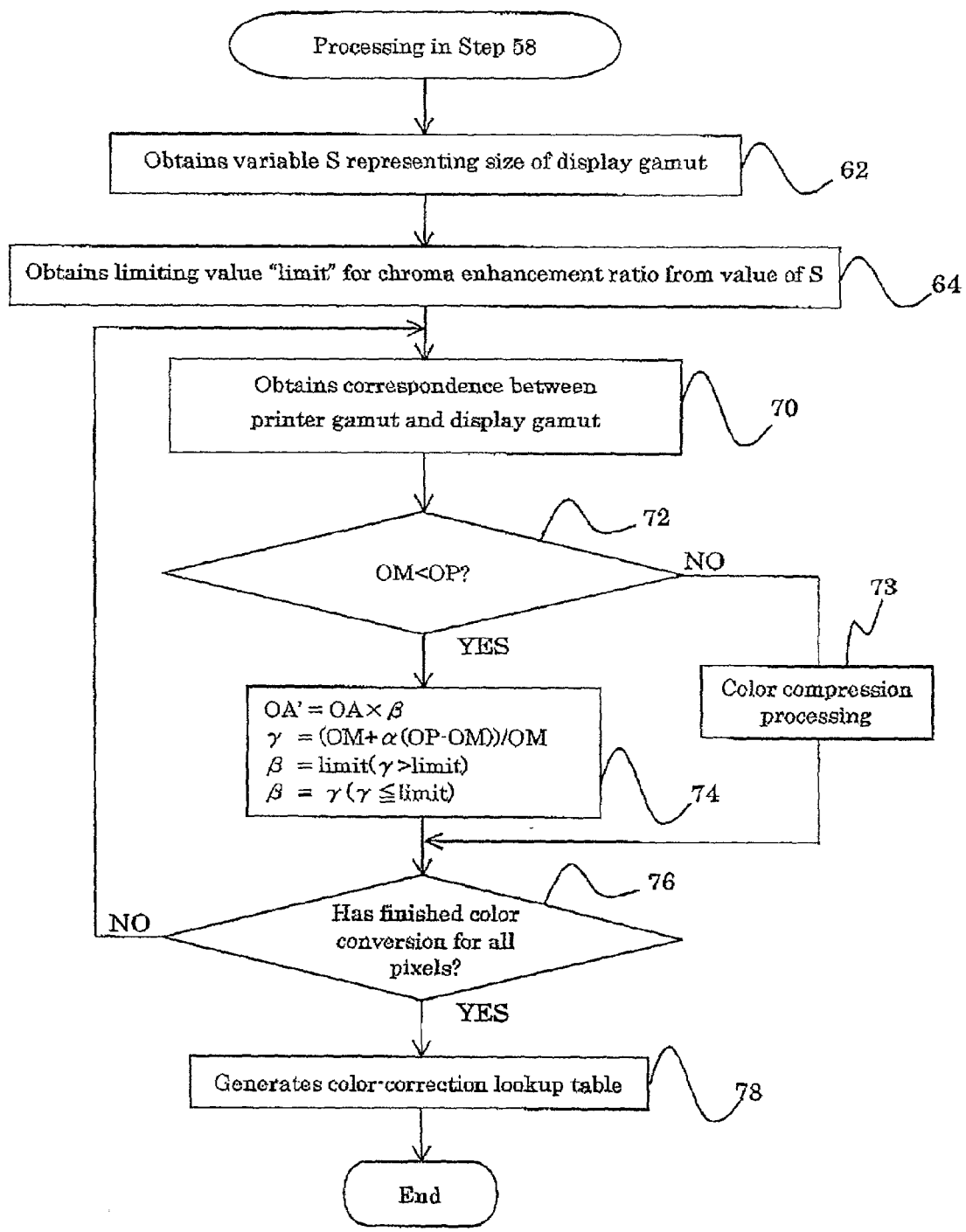
FIG. 4 is a flowchart for describing Embodiment 1 of processing for generating a color-correction LUT.
Figure 5:
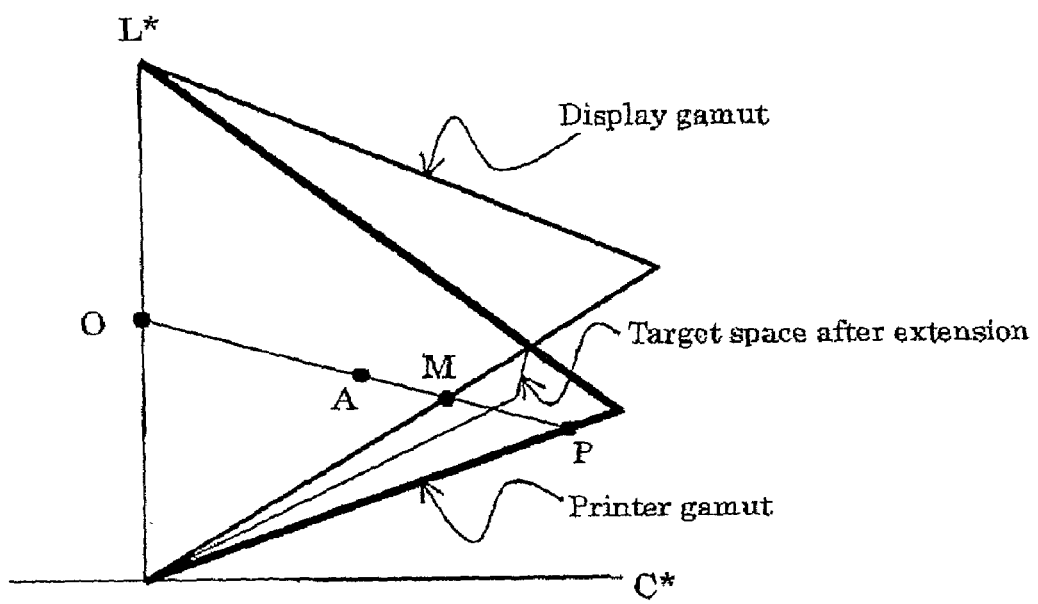
FIG. 5 is a diagram for describing a color conversion processing in the processing for generating a color-correction LUT.
Figure 6:
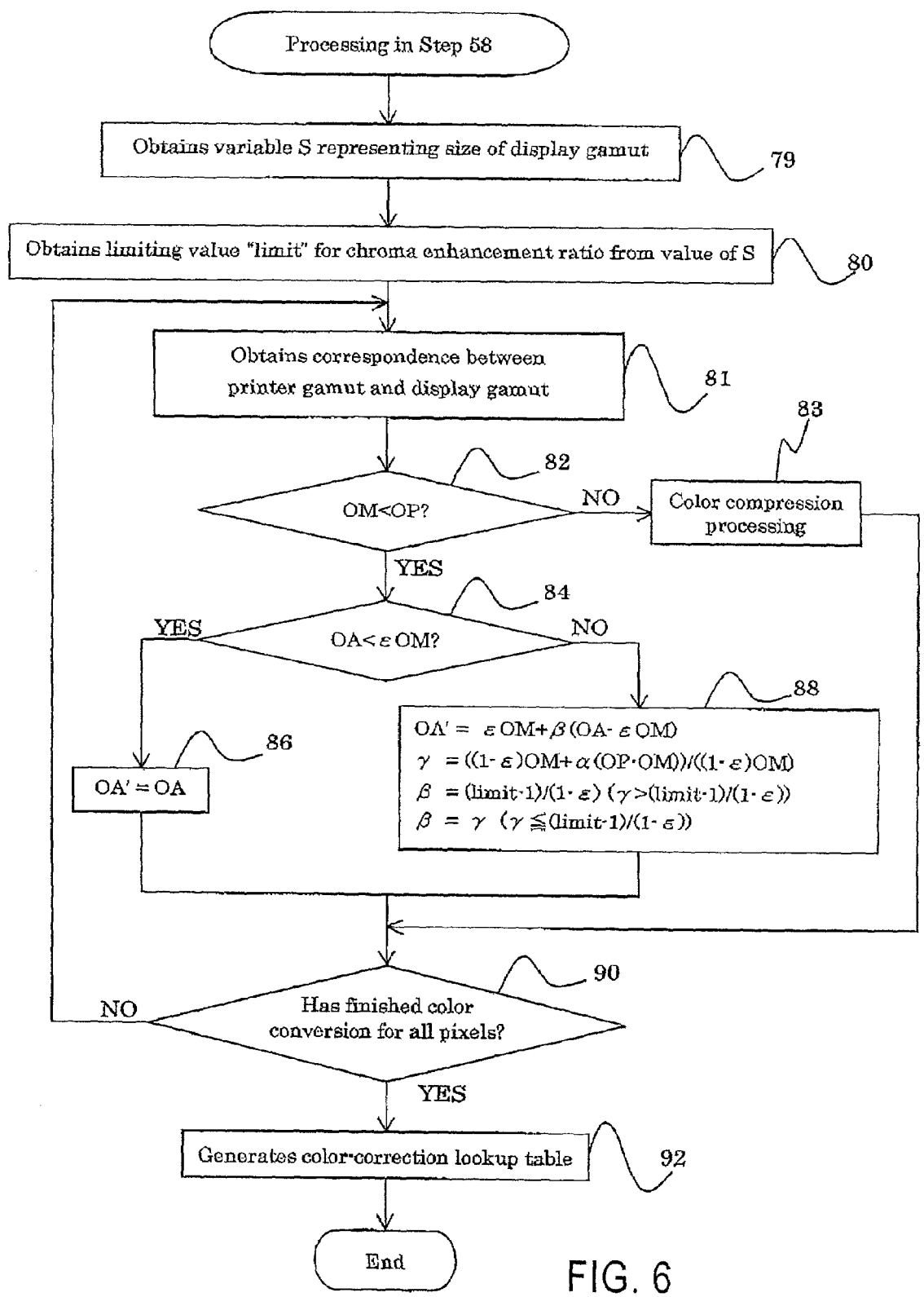
FIG. 6 is a flowchart for describing Embodiment 2 of processing for generating a color-correction LUT.

The following section describes the processing for generating the color-correction LUT in Step 58 while referring to FIG. 4 to FIG. 6.

Embodiment 1

FIG. 4 shows a flowchart for describing Embodiment 1 of the processing for generating a color-correction LUT.

First, the color-correction LUT generator 20f obtains a variable S for indicating the size of display gamut generated by the display gamut generator 20g (Step 62). S is a distance between a chromaticity coordinate system value for RGB= (0, 1, 1) in the input RGB space and a chromaticity coordinate point (0.33, 0.33) for white point in xy chromaticity coordinate system.

For SRGB space, a chromaticity coordinate system value for RGB=(0, 1, 1) is (0.225, 0.329), and the distance S to the white point is 0.105.

For NTSC space, the chromaticity coordinate system value for RGB=(0, 1, 1) in the SRGB space is (0.225, 0.329), and the distance S to the white point is 0.165.

The color-correction LUT generator 20f obtains a limiting value "limit" for chroma enhancement ratio from the value S obtained in Step 62 (Step 64). This limit prevents a shape of the display gamut after extending the display gamut from deforming largely due to an effect of a shape of the printer gamut. The value for "limit" is obtained by using the following equation from a chart shown in FIG. 12.

$$\mathrm{limit}=f(S)$$

Figure 12:
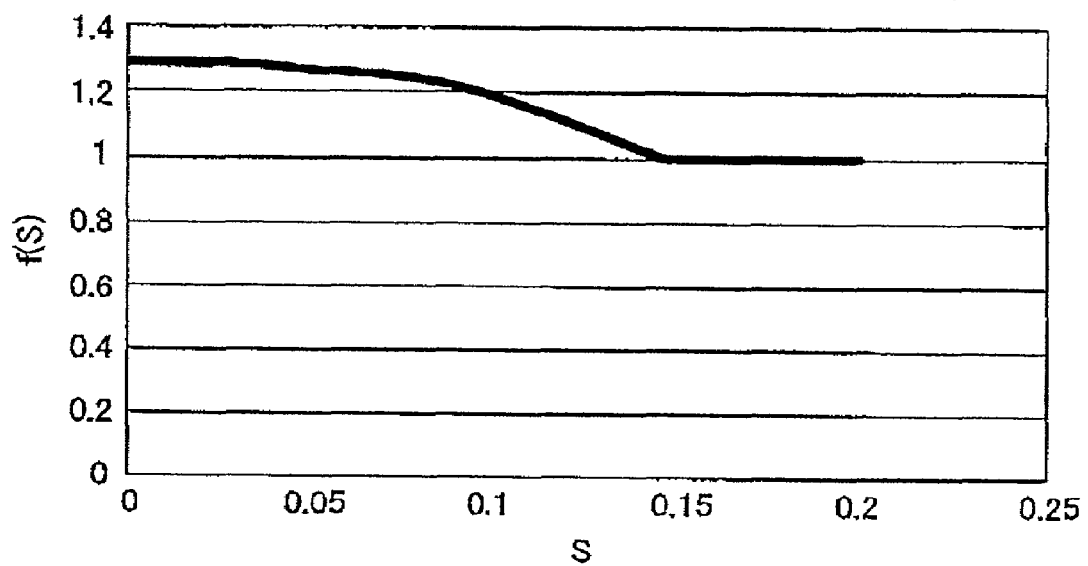
FIG. 12 is a diagram for showing a relationship between the size of an input system gamut and a limiting value "limit" for chroma enhancement ratio.

As shown in FIG. 12, the limiting value "limit" for the chroma enhancement ratio is changed according to magnitude (size) of the input system gamut for changing a degree of the chroma enhancement. Specifically, as the magnitude (size) of input system gamut decreases, the limiting value "limit" for the chroma enhancement ratio is set to increase. In other words, as the magnitude (size) of input system gamut decreases, the degree of chroma enhancement increases.

Figure 13:
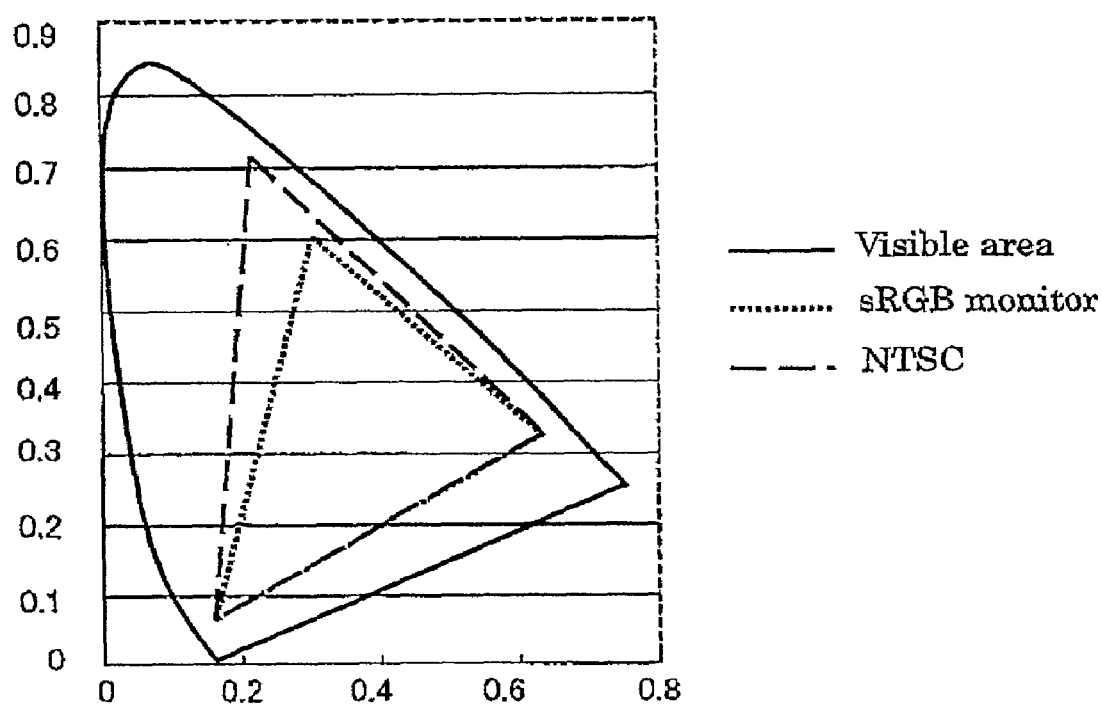
FIG. 13 is a diagram for describing a relationship between sRGB color space and NTSC color space.

When a specified input system gamut is sRGB, the chroma enhancement process is performed, and when a specified color space is sufficiently large against an output system gamut such as NTSC (when S>0.15), the chroma enhancement process is not performed. When a specified input system gamut is sufficiently large against an output system gamut, reproducing colors in nature with high chroma is possible without the chroma-enhancement processing, and the chroma-enhancement processing in this case adversely reproduces unnatural colors. A figure for describing a relationship between sizes of the sRGB color space and the NTSC color space is shown in FIG. 13.

Then, the color-correction LUT generator 20f obtains a correspondence between the printer gamut generated by the printer gamut generator 20e, and the display gamut generated by the display gamut generator 20g in CIELAB space (Step 70).

A figure for describing the color conversion processing in processing for generating a color-correction LUT is shown in FIG. 5. A desired color point in the input data is point A. A line is drawn passing through the point A from a point O (L*=50) on achromatic axis. A point M is an intersection between the line OA and a boundary surface of the display gamut, and a point P is an intersection between the line OA and a boundary surface of the printer gamut.

The color-correction LUT generator 20f determines whether OM<OP or not (Step 72). In other words, it is determined whether the printer gamut boundary surface (point P) in a predetermined area is outside the display gamut boundary surface (point M).

When OM<OP (Step 72, Yes), in other words, the printer gamut boundary surface (point P) in a predetermined area is outside the display gamut boundary surface (point M), the extension (chroma enhancement) processing is applied to the desired color point A in input data to better use the printer gamut area, which is wider than the display gamut area. When the point A becomes a point A' after applying the extension (chroma enhancement) processing, the point A' is determined by:

OA'=OA×β
γ=(OM+α(OP−OM))/OM
β=limit(γ>limit)
β=γ(γ≦limit) (Step 74).

Conducting the extension processing toward the point A' on the line OA in this way enables the extension processing while hue is maintained as constant. In other words, the extension processing is performed so as to save hue.

Gamut extension ratio is α. α takes a value in a range of 0 ≦α≦ 1.0, and is a parameter for setting how the gamut is extended against the target display gamut. When α=1.0, the gamut is extended up to the printer gamut.

Figure 14:
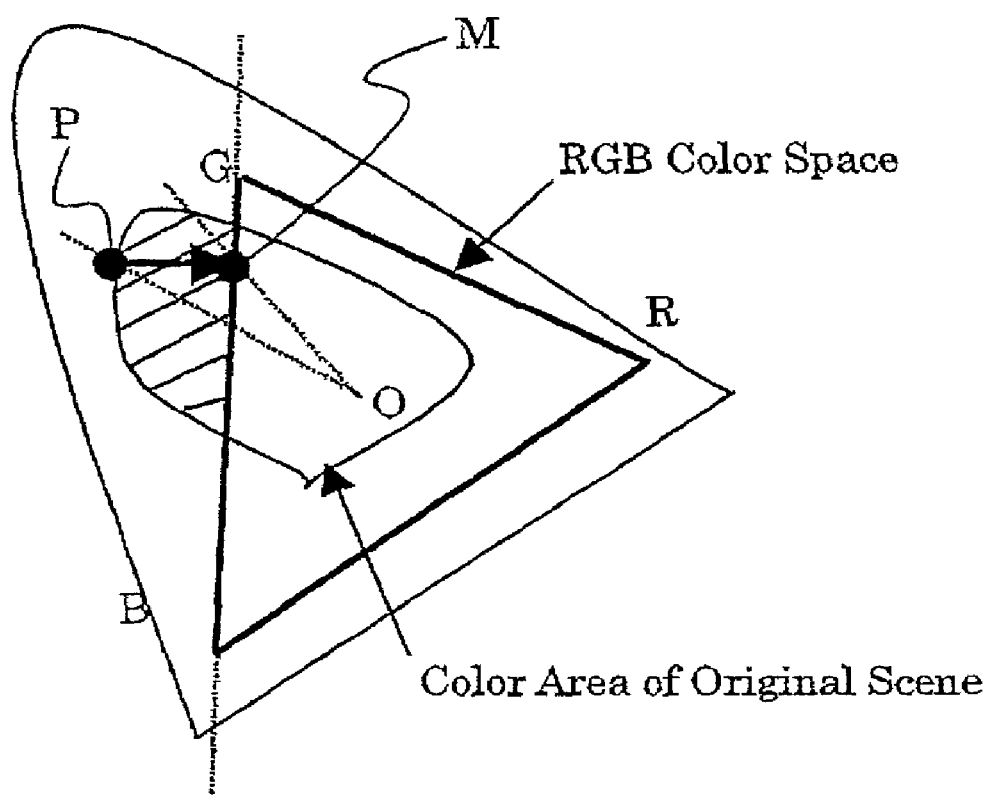
FIG. 14 is a diagram for describing a chroma-enhancement processing in a direction approximately perpendicular to an input system gamut surface.

In place of performing the chroma-enhancement processing so as to maintain hue, a chroma-enhancement processing in a direction approximately perpendicular to the input system gamut surface may be performed. In RGB color space as indicated in FIG. 14, when a color point before the chroma-enhancement processing is placed at C, an R value for the point C satisfies R<0. Since color representation values in RGB processed in a computer take positive values in general, the R value for this color point P is assumed as R=0, and is converted to chromaticity at M. This color conversion represents a translation almost perpendicular against a boundary (input system gamut surface) of the RGB color space as indicated in FIG. 14. As indicated in FIG. 14, though the extension processing is performed in a direction perpendicular to the B-G line in green-blue area, the extension processing should be performed in directions perpendicular to lines R-G and R-B in other color areas.

The chroma-enhancement processing changes hue. When the hue changes from original color after the chroma-enhancement processing, to make the changed colors close to their original colors in the chroma-enhancement processing, it is preferable to perform the chroma-enhancement processing in a direction for decreasing the hue (P→M direction) and in the inverse direction (M→P) in FIG. 14.

The description above is for x-y coordinate space, the same description is applicable to other spaces such as L*a*b* space.

Figure 15:
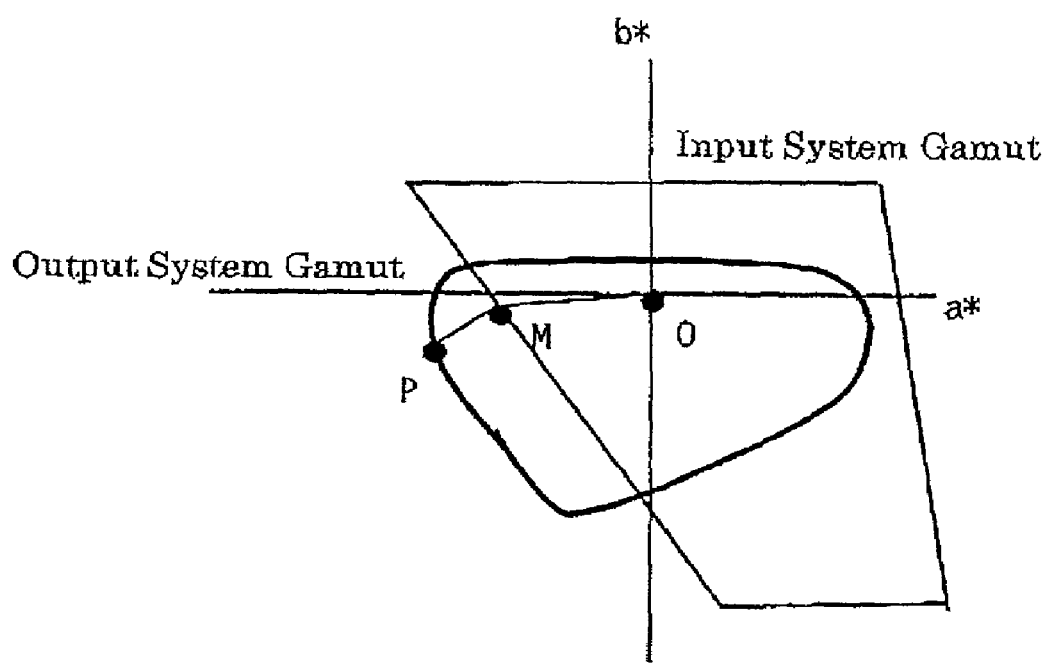
FIG. 15 is a diagram for describing a relationship among points O, M, and P when the chroma-enhancement processing is performed while maintaining hue.

As shown in FIG. 15, when the chroma-enhancement processing is performed with L*a*b* space as a processing space, MP is perpendicular to an input color space.

When OM>OP (Step 72, No), in other words, the printer gamut boundary surface in predetermined area is inside the display gamut boundary surface, the compression processing is applied to a color point outside the printer gamut and inside the display gamut (Step 73). The compression processing is performed so as to save hue.

By applying the processing in Step 70 to Step 76 to the entire pixels (Step 76, Yes), the color-correction lookup table is generated (Step 78), and the processing in Step 58 ends.

Using the color-correction lookup table generated in this way reproduces colors on a printer that are not reproduced on a display, and the printer gamut area, which is wider than the display gamut, is efficiently used.

Embodiment 2

FIG. 6 shows a flowchart for describing Embodiment 2 of the processing for generating a color-correction LUT.

With Embodiment 1 of the processing for generating a color-correction LUT, though chroma of colors close to achromatic color is enhanced, it is possible to prevent the chroma from being enhanced for the colors close to achromatic color with Embodiment 2.

The color-correction LUT generator 20f obtains the variable S for representing the size of display gamut generated by the display gamut generator 20g as Embodiment 1 (Step 79), a limiting value "limit" for chroma enhancement ratio is obtained from the value S obtained in Step 79 (Step 80). The definitions for S and "limit" are the same as those in Embodiment 1. The limiting value for the chroma enhancement ratio, "limit" is obtained by using the following equation from a chart shown in FIG. 12, limit=f(S), and as shown in FIG. 12, the limiting value "limit" for the chroma enhancement ratio is changed according to a magnitude (size) of the input system gamut for changing the degree of chroma enhancement. Specifically, as the magnitude (size) of input system gamut decreases, the limiting value "limit" for the chroma enhancement ratio is set to increase. In other words, as the magnitude (size) of input system gamut decreases, the degree of chroma enhancement increases.

When a specified input system gamut is sRGB, the chroma enhancement process is performed, and when a specified color space is sufficiently large against an output system gamut such as NTSC, the chroma enhancement process is not performed.

Then, the color-correction LUT generator 20f obtains a correspondence between the printer gamut generated by the printer gamut generator 20e, and the display gamut generated by the display gamut generator 20g in CIELAB space (Step 81).

A figure for describing the color conversion processing in processing for generating a color-correction LUT is shown in FIG. 5. A desired color point in the input data is point A. A line is drawn passing through the point A from a point O (L*=50) on the achromatic axis. A point M is an intersection between the line OA and a boundary surface of the display gamut, and a point P is an intersection between the line OA and a boundary surface of the printer gamut.

The color-correction LUIT generator 20f determines whether OM<OP or not as in Embodiment 1 (Step 82). In other words, it is determined whether the printer gamut boundary surface (point P) in a predetermined area is outside the display gamut boundary surface (point M).

When OM<OP (Step 82, Yes), in other words, the printer gamut boundary surface (point P) in a predetermined area is outside the display gamut boundary surface (point M), the extension (chroma enhancement) processing is applied to the desired color point A in input data to better use the printer gamut area, which is wider than the display gamut area. When the point A becomes a point A' after applying the extension (chroma enhancement) processing, the point A' is determined by:

When OA<εOM (Step 84, Yes), OA'=OA (Step 86), and
When OA≧OM (Step 84, No),
OA'=εOM+β(OA−εOM)
δ=((1−ε)OM+α(OP−OM))/((1−ε)OM)
γ=(limit−1)/(1−ε)(γ>(limit−1)/(1−ε))
β=γ(γ≦(limit−1)/(1−ε)) (Step 88).

Conducting the extension processing toward the point A' on the line OA in this way enables the extension processing while hue is maintained as constant. In other words, the extension processing is performed so as to save hue.

Non-extended area ratio is $\epsilon$ (value of $\epsilon$ is set to 0.5, for example). When OA is smaller than $\epsilon$OM, the extension processing is not performed, and chroma is not enhanced for colors close to achromatic color.

Gamut extension ratio is $\alpha$ as in Embodiment 1. $\alpha$ takes a value in the range of $0 \leq \alpha \leq 1.0$, and is a parameter for setting how the gamut is extended against the target display gamut. When $\alpha=1.0$, the gamut is extended up to the printer gamut.

In place of performing the extension processing so as to maintain hue, it is possible to perform an extension processing in a direction approximately perpendicular to the B-G line in x-y chromaticity coordinate system.

When OM>OP (Step 82, No), in other words, the printer gamut boundary surface in predetermined area is inside the display gamut boundary surface, the compression processing is applied to a color point outside the printer gamut and inside the display gamut (Step 83). The compression processing is performed so as to save hue.

By applying the processing in Step 80 to Step 86 to the entire pixels (Step 90, Yes), the color-correction lookup table is generated (Step 92), and the processing in Step 58 ends.

Using the color-correction lookup table generated in this way reproduces colors on a printer that are not reproduced on a display, and the printer gamut area, which is wider than the display gamut, is efficiently used.

The following section describes the operation of printer driver 12c while referring to FIG. 7 to FIG. 10.

Embodiment 1

Figure 7:
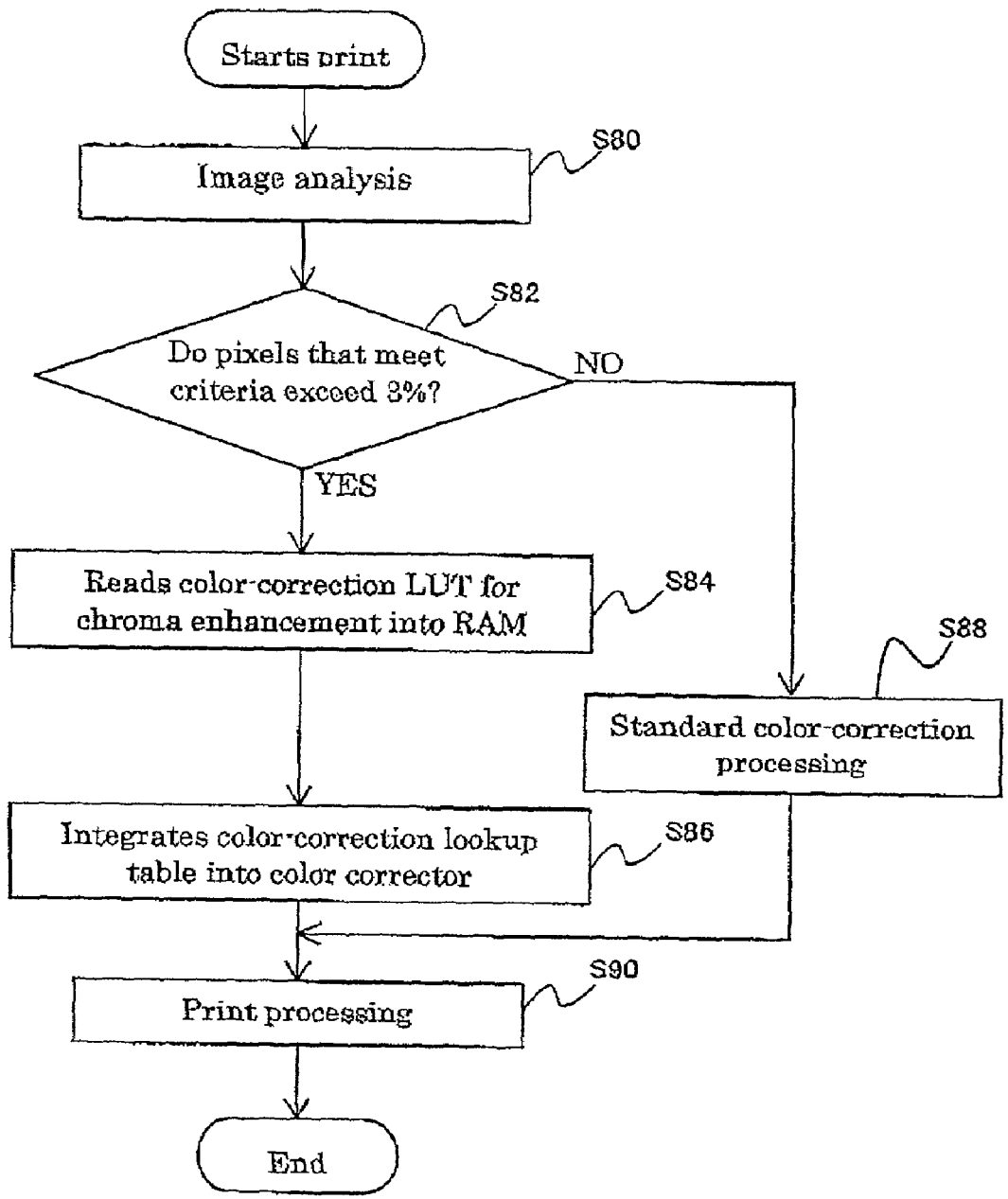
FIG. 7 is a flowchart for describing Embodiment 1 of an operation of a printer driver 12c.

FIG. 7 shows a flowchart for describing Embodiment 1 of operation of the printer driver 12c. In Embodiment 1, image analysis is applied to an input image data, it is assumed that an original scene has brighter colors than the input system gamut when there are large amount of colors in a neighborhood from green to blue, which have high chroma, and the chroma enhancement is applied. It is prevented that the chroma enhancement is applied to an image that does not require the chroma enhancement. In the present embodiment, it is assumed that the color-correction lookup table for the chroma enhancement generated by the method for generating color-correction LUT described above, and a standard color-correction lookup table without the chroma enhancement are stored in the color-correction LUT storage 20h before hand.

As described in FIG. 7, when a user directs start of printing, the image analysis is applied to the input image data (Step S80). The color corrector 20b determines whether pixels that meet the criteria:

R<5, G>40, and B>40 exceed 3% of the entire pixels while referring to the R, G, and R values of the input image data (Step S82). The color corrector 20b assumes that colors in an original scene are brighter than the input system gamut when pixels meeting the criteria described above exceed 3% or more (Step S82, Yes), and performs the chroma enhancement. In other words, the color-correction lookup table for chroma enhancement is read from the color-correction LUT 20h, and is written into the RAM (Step S84). Then, the color-correction lookup table is integrated into the color corrector 20b (Step S86), and the print processing is performed (Step S90).

Figure 8:
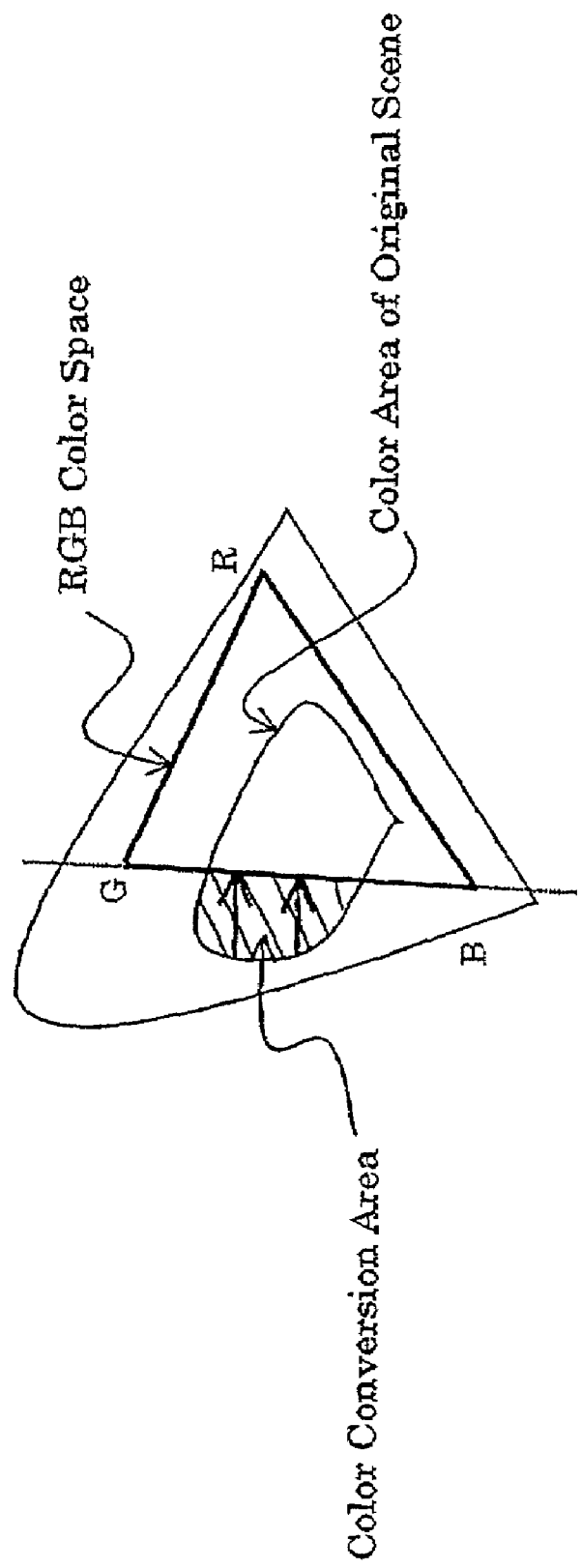
FIG. 8 is a diagram for describing a relationship between a color area of an original scene and an RGB color space (display gamut) when chroma-enhancement processing is applied.

A figure for describing a relationship between a color area of an original scene and the RGB color space (display gamut) when the chroma-enhancement processing is performed is shown in FIG. 8. As shown in FIG. 8, colors in a color conversion area becomes R=0 after they are digitized through an input apparatus. A color conversion indicated by arrows is performed.

When pixels meeting the criteria described above do not exceed 3% or more (Step S82, No), the standard color-correction processing is performed while referring to the standard color-correction lookup table (Step S88), and the print processing is performed (Step S90).

Figure 9:
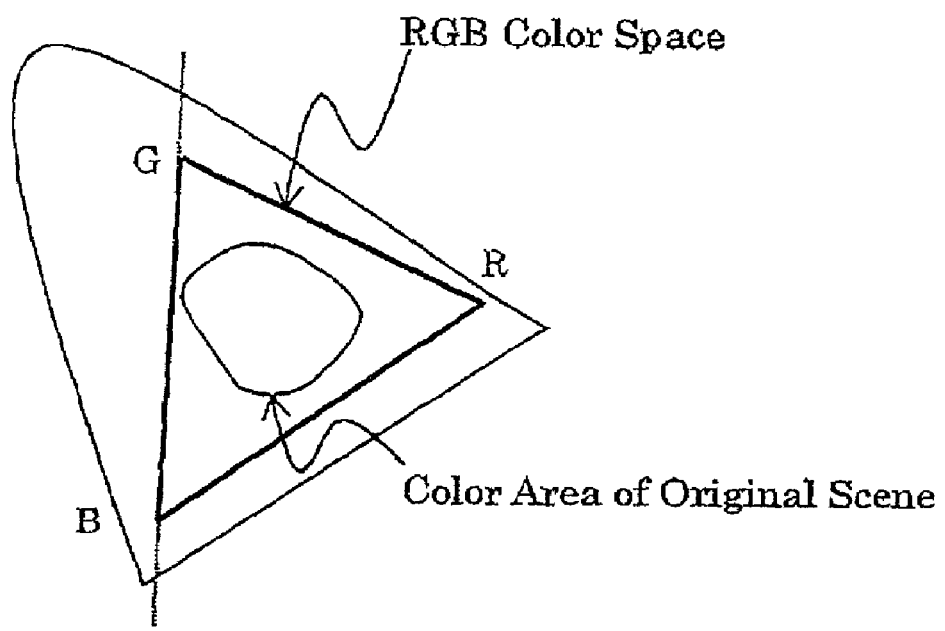
FIG. 9 is a diagram for describing a relationship between a color area of an original scene and the RGB color space (display gamut) when chroma-enhancement processing is not applied.

A figure for describing a relationship between a color area in an original scene and the RGB color space (display gamut) when the chroma-enhancement processing is not performed is shown in FIG. 9. As shown in FIG. 9, when the RGB space includes the entire color area of original scene, data where R<0 are not generated. It is preferable not to perform the chroma-enhancement processing in this case.

With the present embodiment, applying the chroma enhancement to an image that does not require the chroma enhancement is prevented in this way.

Embodiment 2

Figure 10:
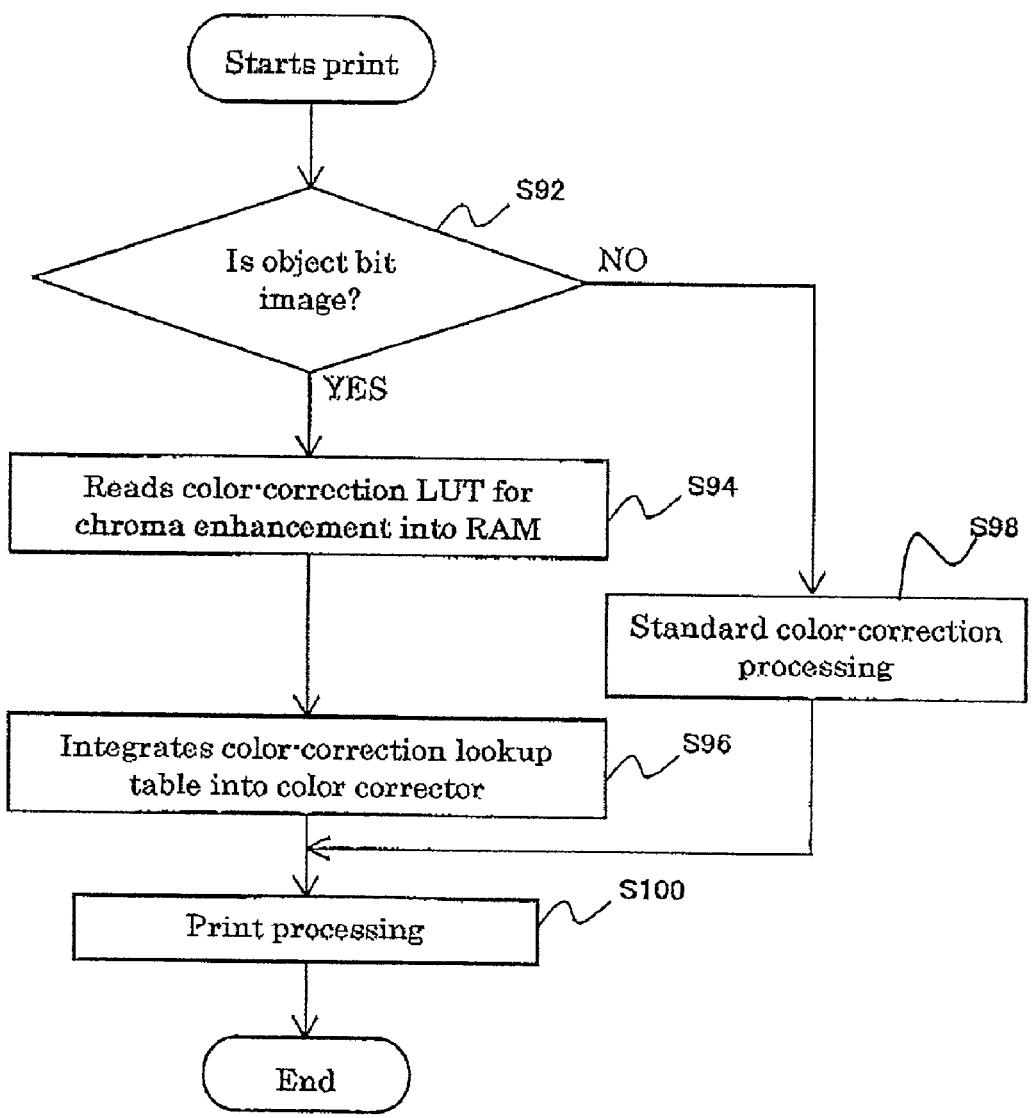
FIG. 10 is a flowchart for describing Embodiment 2 of an operation of a printer driver 12c.

FIG. 10 shows a flowchart for describing Embodiment 2 of operation of the printer driver 12c. In Embodiment 2, the chroma enhancement is applied only when an object is a bit image, and the chroma-enhancement processing is not applied to a text image or a graphics image. A text image does not generally require the chroma enhancement, and since a graphics image is originally created with a computer and colors on a display are colors of the original scene, it is preferable to reproduce the color of display without the chroma enhancement. Applying the chroma enhancement to an image that does not require the chroma enhancement is prevented in this way. In Embodiment 2, it is assumed the color-correction lookup table for the chroma enhancement generated by the method for generating color-correction LUT described above, and a standard color-correction lookup table without the chroma enhancement are stored in the color-correction LUT storage 20h before hand as well.

As described in FIG. 10, when a user directs start of printing, the color corrector 20b determines whether an object is a bit image or not (Step S92).

The color corrector 20b applies the chroma enhancement when the object is a bit image (Step S92, Yes). In other words, the color-correction lookup table for chroma enhancement is read from the color-correction LUT 20h, and is written into the RAM (Step S94). Then, the color-correction lookup table is integrated into the color corrector 20b (Step S96), and the printing processing is performed (Step S100).

When the object is not a bit image (Step S92, No), the standard color-correction processing is applied while referring to the standard color-correction lookup table (Step S98), and the printing processing is performed.

With the present embodiment, applying the chroma enhancement to an image that does not require the chroma enhancement is prevented in this way.

What is claimed is:

1. An image processing apparatus wherein a degree of chroma-enhancement processing is changed according to magnitude of an input system gamut, and a desired color correction is applied by using a color-correction lookup table for enhancing chroma, which applies a desired chroma-enhancement processing to a desired color point in an input image signal, in an area where an output system gamut is wider than the input system gamut, and wherein a desired color correction is applied by using the color-correction lookup table for enhancing chroma when pixels, whose red component is less than a predetermined red threshold, whose green component is more than a predetermined green threshold and whose blue component is more than a predetermined blue threshold exceed a predetermined ratio of the entire pixels of the image signal.

2. An image processing apparatus wherein a desired color correction is applied by using a color-correction lookup table for enhancing chroma, which applies a chroma-enhancement processing in a direction approximately perpendicular to an input system gamut surface to a desired color point in an input image signal, in an area where the output system gamut is wider than the input system gamut, and wherein a desired color correction is applied by using the color-correction lookup table for enhancing chroma when pixels, whose red component is less than a predetermined red threshold, whose green component is more than a predetermined green threshold and whose blue component is more than a predetermined blue threshold, exceed a predetermined ratio of the entire pixels of the input image signal.

3. An image processing apparatus wherein a degree of chroma-enhancement processing is changed according to magnitude of an input system gamut, and a desired color correction is applied by using a color-correction lookup table for enhancing chroma, which applies a desired chroma-enhancement processing to a desired color point in an input image signal, in an area where an output system gamut is wider than the input system gamut, wherein said color-correction lookup table for enhancing chroma has a limiting value for the chroma enhancement, and wherein the limiting value is determined based on a distance between a first chromaticity coordinate system value in an input space and a preset point in a second chromaticity coordinate system.

4. The image processing apparatus as claimed in claim 3, wherein the first chromaticity coordinate system is an RGB space.

5. The image processing apparatus as claimed in claim 3, wherein the second chromaticity coordinate system is an xy chromaticity coordinate system.

6. The image processing apparatus as claimed in claim 3, wherein the input space is an RGB input space.

7. The image processing apparatus as claimed in claim 3, wherein the preset point is a white paint.

8. The image processing apparatus as claimed in claim 3, wherein the limiting value prevents large deformation of the input system gamut due to chroma enhancement processing based on the shape of the output system gamut.

9. An image processing apparatus wherein a degree of chroma-enhancement processing is changed according to magnitude of an input system gamut, and a desired color correction is applied by using a color-correction lookup table for enhancing chroma, which applies a desired chroma-enhancement processing to a desired color point in an input image signal, in an area where an output system gamut is wider than the input system gamut, and wherein the chroma enhancement processing is based on the equation:

$$OA'=OA \times \beta$$

where OA is the distance to a point in the input space gamut, $\beta$ is based on a gamut extension ratio, a boundary of the input space gamut, and a distance between the boundary of the input space gamut and the output space gamut.

10. The image processing apparatus as claimed in claim 9, wherein $\beta$ is based on the equation:

$$(OM+\alpha(OP-OM))/OM$$

where $\alpha$ is a gamut extension ratio, OM is a boundary distance of the input space gamut, and OP is a boundary distance of the output space gamut.

11. An image processing apparatus wherein a degree of chroma-enhancement processing is changed according to magnitude of an input system gamut, and a desired color correction is applied by using a color-correction lookup table for enhancing chroma, which applies a desired chroma-enhancement processing to a desired color point in an input image signal, in an area where an output system gamut is wider than the input system gamut, and wherein the chroma enhancement processing is based on the equation:

$$OA'=\epsilon OM+\beta(OA-\epsilon OM)$$

where OA is the distance to a point in the input space gamut, a is a non-extended area ratio, OM is a boundary distance of the input space gamut, and $\beta$ is based on a gamut extension ratio, the non-extended area ratio, a boundary of the input space gamut, and a distance between the boundary of the input space gamut and the output space gamut.

12. The image processing apparatus as claimed in claim 11, wherein $\beta$ is based on the equation:

$$((1-\epsilon)OM+\alpha(OP-OM))/((1-\epsilon)OM)$$

where $\alpha$ is a gamut extension ratio and OP is a boundary distance of the output space gamut.

* * * * *